3,338,719
PROCESS OF TREATING MILK WITH
MURAMIDASE
Jiro Sawada, Tetsuo Misaki, Michio Yamagishi, and Toshiya Kitahara, Tokyo, Japan, assignors to Taisho Pharmaceutical Co., Ltd., Tokyo, Japan, a corporation of Japan
No Drawing. Filed Jan. 14, 1965, Ser. No. 425,635
Claims priority, application Japan, Jan. 30, 1964, 39/4,256
9 Claims. (Cl. 99—54)

ABSTRACT OF THE DISCLOSURE

Process of treating sterilized animal milk with the enzyme muramidase (lysozyme) in an amount of about 0.05 to 0.1 mg. of the enzyme per milliliter of milk at a temperature of 30 to 50° C. for from 0.3 to 3 hours. Infants fed such milk show improved propagation of L. lifidus in their intestinal tract.

---

The present invention relates to new and useful milk products. More particularly the invention relates to new milk products which protect infants against the occurrence of intestinal putrefaction and consequent incidence of pathogenic or otherwise undesirable micoorganisms in the intestinal tract. Correlatively, the said milk products enhance the growth and good health of infants fed therewith. The invention is also concerned with the preparation of such milk products.

The new milk products of the present invention are particularly advantageously prepared by a process, the characteristic feature of which is the treatment of milk with the enzyme "muramidase" under economical and effective conditions, i.e. optimal concentration of the enzyme, temperature, and time of enzymatic reaction.

Muramidase is a known enzyme obtained from egg white. It is generally known as a hydrolase for mucopolysaccharides and microoragnism cell-membranes consisting of mucopolysaccharides.

With the constant increase in so-called artificial (bottle) feeding of infants, as distinguished from natural (human) breast feeding, differences in chemical compositions of human milk and of animal milk—the latter being primarily used in bottle feeding—and the influences of the two types of milk upon the health of infants and upon their intestinal microflora, have been recently studied chemically and pediatrically, primary emphasis being placed upon cow's milk as the animal milk.

Incident to such study and research, many attempts have already been made to modify the chemical composition of animal milk to correlate it as far as possible to the chemical composition of human milk by means of an additament or additaments to the latter, such for example as β-lactose, proteins of albumin and globulin other than casein, unsaturated fatty acids and nucleotides.

Generally speaking, no remarkable differences in apparent growth between breast-fed babies and bottle-fed babies (using other than human milk) have been recognized in the aforesaid studies. As between bottle-fed babies, breast-fed babies and babies fed in part by breast and in part by bottle, a tendency has been recognized toward lowest morbidity and mortality rates in human milk-fed (breast fed) babies and highest morbidity and mortality rates in the bottle-fed babies.

A number of investigators have reported that Lactobacillus bifidus (Bifidobacterium bifidium) is propagated at the rate of 80 to 85% in the intestinal microflora of human milk-fed babies, but at the rate of only 10% in that of bottle-fed babies.

It has also been reported that in the intestinal flora of bottle-fed babies, in general, the number of harmful bacteria, such as Escherichia coli (Bacterium coli) and enterococci is greater than that of L. bifidus, and that E. Coli give rise to harmful substances in the intestinal tract, for instance, hydrogen sulfide, ammonia and histamine-like substances. These harmful substances may very well be connected with hepatitis, hepatocirrhosis, hepatic coma, macrocytic anemia, kidney disease, digestive toxicosis, etc.

On the other hand, growth of L. bifidus increases the quantity of thiamine, riboflavin and antidiarrheic activities in the intestinal tract, and thus exerts a good control over the metabolism of the infant whose tract is well supplied with the said microorganism and affords protection against functional disease, such e.g. as insufficiency of gastric juices, etc.

It is a primary object of the present invention to embody novel animal milk compositions which are essentially equivalent to human milk as regards generation of L. bifidus in the intestinal tract of infants fed with such compositions. Briefly stated, this object is realized by incorporating muramidase into the animal milk compositions. However, such mere incorporation is not sufficient to achieve the goal in view, since certain metes and bounds must be strictly observed in preparing the objective compositions of the invention.

For example, if cow's milk is treated at a rate of about 0.05 to 0.1 mg./ml. (milligrams per milliliter) with crystalline muramidase under the following conditions, i.e. at about 30 to 50° C. as reaction temperature and for about 0.3 to 3 hours as reaction time, the treatment consisting in intimately admixing the muramidase with the milk, it is found that such a propagation of L. bifidus takes place that the resultant milk product can not be differentiated from human milk as regards L. bifidus content.

The crystalline muramidase is preferably that obtained in per se known manner by crystallization from egg white at the isoelectric point. The cow's milk is sterilized milk.

The following Table 1 sets forth comparative data with respect to the propagation of L. bifidus in (a) human milk and (b) cow's milk treated with muramidase after the manner of the preceding two paragraphs:

TABLE 1.—PROPAGATION OF *L. BIFIDUS* IN (a) HUMAN MILK AND (b) COW'S MILK TREATED WITH MURAMIDASE

| | Human milk | Cow's milk treated with the enzyme | | | | | 13.5% solution (by weight) of cow's milk powder treated with the enzyme | | | | | Cow's milk treated with the inactivated enzyme* |
| --- | --- | --- | --- | --- | --- | --- | --- | --- | --- | --- | --- | --- |
| Concentration of muramidase, mg./ml. | | 0 | 0.05 | 0.1 | 1.0 | 2.0 | 0 | 0.05 | 0.1 | 1.0 | 2.0 | 0.1 |
| | Numbers of the active cells, *L. bifidus*: $\times 10^{-6}$/ml. | | | | | | | | | | | |
| Incubation time (hours): | | | | | | | | | | | | |
| 0 | 7 | 7 | 7 | 7 | 7 | 7 | 7 | 7 | 7 | 7 | 7 | 7 |
| 24 | 230 | 13 | 280 | 310 | 230 | 290 | 130 | 183 | 245 | 223 | 221 | 14 |
| 48 | 32 | 25 | 63 | 120 | 110 | 43 | 92 | 9 | 63 | 50 | 106 | 25 |
| 72 | 11 | 34 | 64 | 85 | 6 | 35 | 20 | 5 | 7 | 5 | 3 | 36 |

*After aqueous solution of the enzyme was heated at 100° C. for 30 minutes, it was added to the cow's milk.

METHOD OF COUNTING THE ACTIVE CELLS

*L. bifidus*, which is separated from the feces of the human milk-fed infants by the yellow phosphorus combustion method, was inoculated in C.T.J. medium and incubated at 37° C. for 48 hours after covering its surface with liquid paraffin layer. After incubation, the broth of the anaerobe was diluted to the desired numbers of the active cells by distilled water according to the stepwise dilution method. And then 1 milliliter of the diluted broth was added into 9 milliliters of each of sterilized cow's milk, human milk and aqueous solution of cow's milk powder and was again incubated at 37° C. by the liquid paraffin sealed method.

The samples for counting active cells were pipetted up every 24 hours and diluted to the 10-fold volume by saline.

1 milliliter of the sample thus obtained was added to 9 milliliters of baker's yeast extracted solution/agar medium composed of 0.5 gram of glucose, 1.0 gram of peptone, 0.5 gram of lactose, 0.8 gram of NaCl, 0.05 gram of cysteine hydrochloride, 0.5 gram of ascorbic acid, 0.5 gram of agar powder and 100 milliliters of bakers' yeast extracted solution, i.e. supernatant fluid separated by a centrifuge after adding 1800 milliliters of distilled water to 900 grams of baker's yeast and boiling at 100° C. for 3 hours.

Then the culture was incubated at 37° C. for 24 hours after gelatinization of the agar culture medium. Numbers of the active cells were calculated from multiplying numbers of colonies of *L. bifidus* and diluting ratio of culture medium, in the usual way.

C.T.J. culture medium: Japanese Journal of Pediatrics 13, No. 3, 47–52 (1960).

The "bifidus factor" (factor promoting the growth of *L. bifidus* in milk products according to the present invention) is ascribable to a hydrolysate of mucopolysaccharides and mucoprotein which is produced on treatment of the cow's milk with muramidase. Likewise the enhanced propagation of *L. bifidus* in the infant intestinal track is due to the large quantity of said factor in the treated milk fed to the infant. However, the addition of an unduly large amount of muramidase to cow's milk reveals a tendency toward decrease in the growth-promoting effect of the milk for *L. bifidus*. This decrease is ascribable to the "over-hydrolyzing" of the mucoprotein and mucopolysaccharides. In other words, over-hydrolyzed mucopolysaccharides are to be avoided for the purposes of the present invention.

However, the correct interrelation of concentration of muramidase, reaction temperature and reaction time, according to the present invention, results in useful milk products which promote the growth of *L. bifidus*:

TABLE 2.—REACTION TIME AT 0.1 MG./ML. OF ENZYME CONCENTRATION AND GROWTH OF *L. BIFIDUS* IN COW'S MILK SO-TREATED

| Incubated time (hours) | Reaction time (hours) | | | | | |
| --- | --- | --- | --- | --- | --- | --- |
| | 0 | 3 | 6 | 9 | 12 | Control |
| | Numbers of the active cells, *L. bifidus*: $\times 10^{-6}$/ml. | | | | | |
| 0 | 3.2 | 3.2 | 3.2 | 3.2 | 3.2 | 3.2 |
| 24 | 138 | 180 | 115 | 103 | 98 | 10 |
| 48 | 75 | 12 | 162 | 59 | 59 | 45 |
| 72 | | | | | | 34 |

The reaction temperature was 37° C.

This counting of the cells was carried out by the same method as in connection with Table 1.

After treating the cow's milk with muramidase for the time (hours) indicated, the treated milk was heated at 80° C. for 30 minutes to inactivate the said enzyme.

Under the above-mentioned conditions, maximum growth of *L. bifidus* is shown in the milk products treated for 3 hours, and when the reaction time is prolonged over 3 hours, the effect is reduced gradually.

As hereinbefore indicated, the objective of the present invention requires treating the animal milk (e.g. cow's milk) with muramidase at the correct (optimum and economical) concentration at the properly correlated temperature and for the proper reaction time.

Table 3 shows the interrelation of reaction time, temperature and concentration of the said enzyme for cow's milk to realize the aforesaid objective.

TABLE 3.—VARIOUS REACTION TIMES (HOURS) AND ENZYME CONCENTRATIONS IN THE TREATMENT OF COW'S MILK WITH MURAMIDASE TO OBTAIN THE MAXIMUM GROWTH OF *L. BIFIDUS*

| Enzyme Conc'n | Reaction Temperature (° C.) | | | | |
| --- | --- | --- | --- | --- | --- |
| | 20 | 30 | 40 | 50 | 60 |
| | Hours | Hours | Hours | Hours | Hours |
| 0.01 mg./ml. | | 6–9 | 3–4 | 2 | 0.5 |
| 0.05 mg./ml. | 12 | 6 | 2–3 | 0.5–1.0 | 0.5 |
| 0.1 mg./ml. | 9 | 3 | 1–2 | 0.5 | |

Generally, it is recognized that the activity of muramidase obtained from egg white is more active in the presence of salt, mono- or bivalent metal ion. However, the activity of the enzyme is often inhibited in the presence of yeast nucleic acid and of iodine surfactants.

In the former event, i.e. when the substances promoting enzymatic activity are added to cow's milk with the enzyme, the expectant object of this invention can be attained effectively and economically at lower enzyme concentration and reaction temperature, and at shorter reaction time.

In the latter case, i.e. in view of the fact that the enzymatic activity is inhibited by addition of nucleic acid, iodine surfactants, it is advantageous to treat the cow's milk with the enzyme before the addition of the above substances to the cow's milk.

It is also within the scope of this invention to add the muramidase, not as such, but in the form of cow's milk already modified by muramidase according to the present invention. In some cases this has an enhancing effect. Thus, when 1 part by volume of modified cow's milk was treated by muramidase mixed with 3 parts by volume of cow's milk, the growth of L. bifidus was still more promoted as shown in the following Table 4.

TABLE 4.—RELATIONSHIP BETWEEN THE GROWTH OF L. BIFIDUS AND THE MIXING RATIO IN VOLUME OF COW'S MILK TREATED WITH MURAMIDASE TO COW'S MILK UNTREATED

| Incubated time (hours) | Mixing percentage of the modified cow's milk according to this invention | | | | |
|---|---|---|---|---|---|
| | 0 | 10 | 25 | 50 | 100 |
| | Numbers of the active cells, L. bifidus; $\times 10^{-6}$/ml. | | | | |
| 0 | 4.40 | 4.40 | 4.40 | 4.40 | 4.40 |
| 24 | 19 | 115 | 272 | 188 | 121 |
| 48 | 31 | 12 | 5 | 21 | 40 |
| 72 | 17 | 0.3 | 0.2 | 7 | 10 |

METHOD OF DETERMINATION 0.1 milligram of the enzyme was added to 1 milliliter of sterilized cow's milk. The mixture was treated at 37° C. for 3 hours and then heated to 80° C. for 30 minutes to inactivate the said enzyme.

After freeze drying of the treated mixture, it gave a powder. The aqueous solution of the powder was added to cow's milk and sterilized. L. bifidus was inoculated into thus obtained milk and was incubated.

The growing number of L. bifidus was counted by the same method as in connection with Table 1.

The rationale of this result—promoted growth of L. bifidus—appears to reside in the fact that the direct growth factor for the L. bifidus is not the protein of the muramidase itself but hydrolysate of mucopolysaccharide contained in the modified cow's milk, namely, the cow's milk previously treated with muramidase.

Presently preferred illustrative embodiments of the invention are set forth in the following examples:

*Example 1*

150 liters of sterilized cow's milk were mixed with 15 grams of crystalline muramidase (which was obtained from egg white by direct crystallization at the isoelectric point, followed by six-fold recrystallization), and then heated at 50° C. for 30 minutes.

The thus-treated mixture was thereupon heated to 90° C. for 20 seconds in a sterilizer.

Then the mixture, containing resultant inactivated enzyme, was added to 450 liters of cow's milk, which had been sterilized by heating to 90° C. for 20 seconds.

The final product was packed in bottles and pasteurized.

*Example 2*

150 liters of sterilized cow's milk were mixed with 300 grams of sodium chloride and 7.5 grams of muramidase, prepared according to the process described in Example 1, and heated to 40° C. for 3 hours.

The mixture was admixed with 12,000 grams of lactose, 7,000 grams of glucose, 10,000 grams of cane-sugar and 450 liters of the sterilized cow's milk.

The resultant milk mixture was concentrated in vacuo and atomized in the manner conventional in the production of powdered milk. It gave a milk powder in yield of 95,000 grams.

*Example 3*

150 liters of sterilized cow's milk were mixed with 7.5 grams of crystalline muramidase and then treated at 50° C. for one hour. The mixture was added to 7,000 grams of glucose, 10,000 grams of cane sugar, 450 liters of sterilized cow's milk and 1,000 grams of linoleic acid.

The mixture thus obtained was concentrated in vacuo and atomized in the aforesaid conventional way. The atomized products were mixed with 12,000 grams of lactose, 1,800,000 I.U. of vitamin A and 3.8 grams of nicotinic amide.

It gave a milk powder in yield of 96,000 grams.

*Example 4*

5 grams of crystalline muramidase were added to 100 milliliters of distilled water.

The solution was mixed and filtered through a Seitz filter. The filtrate was then mixed with 100 liters of sterilized cow's milk which had been flowed through a continuous sterilizer. The product was packed into bottles with pasteurization.

*Example 5*

15 grams of crystalline muramidase were mixed with 12,000 grams of lactose, 7,000 grams of soluble polysaccharide, 1,000 grams of malt extract and 10,000 grams of cane-sugar. And then the mixture was added to 600 liters of cow's milk and concentrated in vacuo and then atomized in the conventional way.

It gave a milk powder in yield of 66,000 grams.

Although cow's milk is indicated as the animal milk employed in each of the foregoing examples, it will be understood that the milk of other animals frequently used for human consumption, as for example the milk of goats, sheep, camels, etc.

In each of the afore-exemplified cases, the resultant product represents achievement of the object of the invention: to provide a milk product which can be used to feed infants and which possesses in enhanced amount the so-called "bifidus factor" for promoting the well-being and growth of the infants fed therewith, and especially protecting such infants from many troublesome disaffections such as diarrhea, insufficiency of gastric juices, "gas," etc. The feces of infants fed with the new products will, other things being equal, be found to be low in content of hydrogen sulfide, ammonia and histamine-like substances, and also low in cells of E. Coli, enterococci and the like.

Having thus disclosed the invention, what is claimed is:

1. The method of improving the health- and growth-promoting qualities of animal milk, whereby its usefulness for the feeding more especially of infants is enhanced, which comprises treating the sterilized animal milk with the enzyme muramidase in an amount of 0.05 to 0.1 milligrams of said enzyme per milliliter of said milk at a temperature of 30 to 50° C. for from 0.3 to 3 hours.

2. The method according to claim 1, wherein the muramidase is crystalline muramidase.

3. The method according to claim 1, wherein the muramidase is in the form of animal milk previously treated therewith under the recited conditions of concentration, temperature and time.

4. The method according to claim 1, wherein the treated milk is sharply heated to a temperature and for a time sufficient to inactivate the enzyme.

5. The method according to claim 4, wherein the treated milk is packaged and pasteurized.

6. The method according to claim 4, wherein the treated milk is spray-dried to yield the corresponding milk powder.

7. The method according to claim 1, wherein the treated milk is cow's milk.

8. The method for improving the health- and growth-promoting qualities of animal milk, whereby its usefulness for the feeding more especially of infants is enhanced, which comprises treating the sterilized animal milk with the enzyme muramidase in amount of 0.05 to 0.1 milligrams of said enzyme per milliliter of said milk at a temperature of 30 to 50° C. for from 0.3 to 3 hours and subsequently heating the thus-treated milk at a temperature of about 90° C. for about 20 seconds.

9. A method as in claim 8 wherein the resultant treated milk is added to untreated animal milk and the thus-obtained mixture sterilized.

References Cited
UNITED STATES PATENTS
2,590,121    3/1952    Polo et al. _____ 195—66

OTHER REFERENCES
Cavalieri, M.: Minerva nipiol 7, 107–9 (1957), as abstracted in Chemical Abstracts, vol. 53,9403i (1959).

A. LOUIS MONACELL, *Primary Examiner.*

L. M. SHAPIRO, *Assistant Examiner.*